United States Patent [19]

Ishii et al.

[11] Patent Number: 5,097,016

[45] Date of Patent: Mar. 17, 1992

[54] NONLINEAR OPTICAL MATERIALS OF POLYPEPTIDES

[75] Inventors: Takafumi Ishii; Takehiro Toyooka; Shigeki Iida; Tomohiro Toya; Itoh Hiroyuki; Hajime Hara, all of Kanagawa; Satoh Tetsuo, Tokyo, all of Japan

[73] Assignee: Nippon Oil Company, Limited, Tokyo, Japan

[21] Appl. No.: 334,594

[22] Filed: Apr. 6, 1989

[30] Foreign Application Priority Data

| Apr. 8, 1988 | [JP] | Japan | 63-86551 |
| Apr. 15, 1988 | [JP] | Japan | 63-93870 |
| Jun. 8, 1988 | [JP] | Japan | 63-140895 |
| Jun. 24, 1988 | [JP] | Japan | 63-157748 |

[51] Int. Cl.⁵ .............................................. C07K 7/10
[52] U.S. Cl. ........................................ 530/350; 428/1; 528/328; 530/345
[58] Field of Search ................ 530/350, 345; 428/1; 528/328

[56] References Cited

U.S. PATENT DOCUMENTS

| 3,871,904 | 3/1975 | Haas et al. | 428/1 |
| 4,513,034 | 4/1985 | Sparer et al. | 428/1 |
| 4,743,675 | 5/1988 | Watanabe | 428/1 |

Primary Examiner—Lester L. Lee
Attorney, Agent, or Firm—Scully, Scott, Murphy & Presser

[57] ABSTRACT

A nonlinear optical material obtained by blending 50-99% by weigth of a polypeptide and 1-50% by weight of a compound exerting a nonlinear optical response has a very large nonlinear optical constant, exterts a high and stable SHG activity and easily undergoes phase matching.

7 Claims, No Drawings

NONLINEAR OPTICAL MATERIALS OF POLYPEPTIDES

BACKGROUND OF THE INVENTION

The present invention relates to nonlinear optical materials.

Nonlinear optical materials have actively been investigated as the important technology for optoelectronics in such fields as wavelength converter of laser beam, optical modulator, optical switch and optical computer. As the nonlinear optical material are well known lithium niobate, potassium dihydrogen phosphate and the like. Unlike these inorganic materials, there have been obtained no crystals of organic materials having a macroscopic second order hyperpolarizability large enough to allow for practical use, although they possess superior characteristics such as a nonclear optical constant 100–1000 times as high, response at a higher speed and stronger resistance to optical damages. In many case, even when the constructing molecule itself has a large secondary molecular susceptibility, the macroscopic second order hyperpolarizability will be zero in crystalline state due to its inversion symmetry with a result that there will be no optical secondary harmonic generation (SHG). As stated above, it is difficult to produce single crystal with no center of symmetry by the use of a low-molecular organic substance alone. Therefore, there have been proposed methods in which such organic molecules are dispersed in a matrix of a macromolecular compound and the host macromolecules are oriented by the aid of external field such as electric field simultaneously allowing for unsymmetric orientation of the guest organic molecules. For example, SHG is observed by blending 4-dimethylamino-4'-nitrostilben (DANS) in a nematic liquid crystalline macromolecules and then applying electric field to the bland to cause orientation [G. R. Meredith, Macromolecules, 15(5), 1385(1982)]. In this method, however, as the DANS can be blended in a concentration as low as 2% at highest, and orientating force of the host macromolecular liquid crystals is not satisfactorily high, there is produced an unsatisfactory nonlinear optical constant several times as high as that of urea. Japanese Patent Laid-open No. 238538/1987 (JP62-238528A) also describes an observation of an SHG of 0.53 μm by incidence of $Nd^{3+}$/YAG laser beam upon a film prepared from a composition of DANS dispersed in thermotropic macromolecular liquid crystals of main chain type. Also in EP No. 244288 are described synthesis of a liquid crystalline polymer of side-chain type in which a mesogen and a unit exerting nonlinear optical response have been linked to the side chain of a polymer such as polyacrylate, polymethacrylate or polysiloxane and orientation of a film from the polymer by applying an electric field followed by incidence of $Nd^{3+}$/YAG laser beam by which an SHG of 0.53 μm is observed. The methods described in these literatures are commonly characterized by the use of a matrix polymer that forms nematic liquid crystals and consequently have a critical disadvantage that a material with a nonlinear optical constant sufficiently high for practical use cannot be produced. Another disadvantage of the method using nematic liquid crystalline polymer is that use of nematic liquid crystalline polymer produces no benefit in the phase matching which is technologically important for practical use, and utilization of conventional birefrigence or optical waveguide is necessary.

On the other hand, use of polyethylene oxide which does not form liquid crystals as a matrix polymer has also been proposed [Miyata et al., Polymer Preprints, Japan Vol. 36, No.8, 2523(1987)]. An SHG 90 times as high as that of urea has been obtained by Miyata et al. by dispersing p-nitroaniline in polyethylene oxide and crystallizing the polyethylene oxide under electric field. As described by Miyata et al., however, it is a problem that intensity of the SHG begins to decrease in about 10 hours eventually to 10% of that of MNA (2-methyl-4-nitroaniline).

SUMMARY OF THE INVENTION

It is an object of the invention to overcome the critical disadvantages of the prior arts for producing a nonlinear optical effect by blending a compound exerting a nonlinear optical response with a macromolecular material and applying an electric field to the blend such as a low SHG activity and a very short life. The inventors have found that nonlinear optical materials using a polypeptide as matrix have a very large nonlinear optical constant, exert a high and stable SHG activity and easily undergo phase matching. The present invention is based upon the above finding.

The invention resides in nonlinear optical materials comprising a composition consisting essentially of 50–99% by weight of a poly peptide and 1–50% by weight of a compound exerting a nonlinear optical response.

As particular examples of the polypeptide used in the invention are mentioned homopolymers and copolymers of two or more of amino acids such as alanine, aminoadipic acid, aminobutyric acid, aminocaproic acid, aminocyclopentanoic acid, aminovaleric acid, aminomalonic acid, arginine, asparagine, aspartic acid, cystein, glutamic acid, glycine, histidine, homocystein, isoleucine, leucine, lysine, methionine, norvaline, ornithine, phenylalanine, serine, threonine, tyrosine, valine and proline. Homopolymers and copolymers of derivatives of these illustrated amino acids are also included Among these polypeptides those which show cholesteric liquid crystallinity are preferably employed. Examples of the polypeptide preferably employed as showing cholesteric liquid crystallinity are homopolymers and copolymers of such amino acids as glutamic acid, asparagic acid and oxyglutamic acid. Homopolymers and copolymers of their ester derivative are additionally mentioned. Above all, polymers of a glutamate and an asparaginate are especially preferred. In particular, polypeptides of the structure represented by the general formula [I] are illustrative.

wherein R represents a group selected from the group consisting of alkyl groups, cycloalkyl groups, aryl groups and arylalkyl groups containing 1–30 carbon atoms, $10 \leq m \leq 2000$ and n is 1 or 2.

As the alkyl group used as R are preferably employed methyl group, ethyl group, propyl group, isopropyl group, butyl group, benzyl group, hexyl group, octyl group, decyl group, dodecyl group, octadecyl group, hexadecyl group, eicosanyl group and those groups which have the same number of carbon atoms as that for the above groups and are of a branched structure. Above all, methyl group, ethyl group, propyl group, butyl group, branched butyl groups, hexyl group, decyl group, dodecyl group, octadecyl group and the like are especially preferable.

As the cycloalkyl group is preferably used cyclopentyl group, cyclopentyl methyl group, methylcyclopentyl group, ethylcyclopentyl group, butylcyclopentyl group, cyclohexyl group, methylcyclohexyl group, ethylcyclohexyl group, butylcyclohexyl group, cyclohexylmethyl group, cyclohexylethyl group, cyclohexylpropyl group, cyclohexylbutyl group, cyclooctyl group, methylcyclooctyl group, cyclododecyl group or the like. Among them, cyclopentyl group, cyclohexyl group, cyclopentylmethyl group, cyclohexylmethyl group or the like is especially preferred. As the aryl group is used phenyl group, toluyl group, dimethyltoluyl group, butylphenyl group, decylphenyl group or dodecylphenyl group. As the arylalkyl group is preferably used benzyl group, methylbenzyl group, phenylethyl group, methylphenylethyl group, phenylpropyl group, phenylbutyl group, phenylhexyl group, phenyloctyl group, phenyldodecyl group, methylphenylbutyl group, ethylphenylhexyl group, methylphenyldodecyl group, biphenylmethyl group or the like. Among them benzyl group, methylbenzyl group, phenylethyl group, phenylbutyl group, biphenylmethyl group or the like is especially preferably used. Groups in which a part of the hydrogen atoms in the aryl group or the arylalkyl group is substituted with a halogen such as fluorine, chlorine or bromine and/or polar group such as cyano group, hydroxyl group or amino group may also be used.

The m in the formula, namely, the degree of polymerization is 10-2000 and preferably 30-1500. Use of a degree of polymerization below 10 will not produce a satisfactory SHG activity. With that over 2000, there will be associated with problems not only of reduction of the SHG activity but also of decrease in formability and others.

Among these cholesteric liquid crystalline polypeptides copolymers of glutamate esters with different $R_2$ are preferably used. For example, preferred are cholesteric liquid crystalline copolymers of glutamate esters represented by the general formula [II]

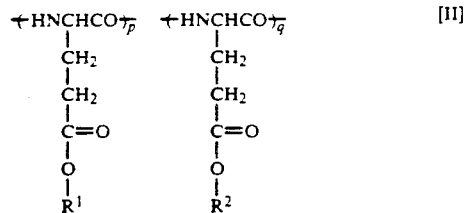

wherein $R_1$ and $R_2$ respectively represent a group selected from the group consisting of alkyl groups, cycloalkyl groups, ary groups and arylalkyl groups containing 1-30, preferably 1-10 carbon atoms for $R_1$ and 1-30, preferably 6-30 carbon atoms for $R_2$ and $R_1$ and $R_2$ are different. Among them those in which difference in carbon numbers between $R_1$ and $R_2$ is 5 or more are preferred. p/q is 80-10/20-90 and preferably 70-40/-30-60. The respective recurring units are usually present at random. With the ratio p/q beyond the above-defined range, no thermotropic cholesteric liquid crystallinity will be exerted. P+q (that is, the degree of polymerization) is 50-2000 and preferably 100-1500. With a degree of polymerization below 50, it will be difficult to fix the liquid crystalline structure. Too large degree of polymerization will also be unpractical due to deficiencies such as decrease in formability and slow growth of the cholesteric structure.

As $R_1$ is especially preferably employed an alkyl group such as methyl group, ethyl group, propyl group, butyl group or a branched butyl group, a cycloalkyl group such as cyclopentyl group, cyclohexyl group, cyclopentylmethyl group or cyclohexyl methyl group, an aryl group such as phenyl group, methylphenyl group toluyl group or dimethyltoluyl group, or an arylalkyl group such as benzyl group or methylbenzyl group. As $R_2$ is especially preferably employed an alkyl group such as hexyl group, decyl group, dodecyl group or octadecyl group, a cycloalkyl group such as cyclohexyl group, methylcyclohexyl group, ethylcyclohexyl group, butylcyclohexyl group, hexylcyclohexyl group, cyclooctyl group, methylcyclooctyl group or cyclododecyl group, an aryl group such as phenyl group, toluyl group, butylphenyl group, decylphenyl group or dodecylphenyl group, or an arylalkyl group such as phenylhexyl group, phenyldodecyl group or dodecylphenyl group.

In the present invention, in addition to the polypeptides with the α-amide linkage illustrated above, those which have the β- or α- amide linkage may also be used.

These polypeptides may be either naturally occurring or synthesized. If, for example, the desired polypeptide is to be produced by synthesis, the NCA method known in the art can be employed; the synthesis can be effected by homopolymerization or copolymerization of the N-carboxy anhydride of a predetermined amino acid or the N-carboxy anhydride of a derivative of the amino acid, for example, of a glutamic acid γ-ester.

Preferably applied is also an ester exchange method according to which first a polymer such as poly-(γ-methyl-L-glutamate) or poly(γ-benzyl-L-glutamate) is prepared and then the polymer is treated with a predetermined alcohol to exchange a part of the ester groups.

Description will be given below on the compound exerting a nonlinear optical response (to be called NLO for short) which is another important component of the nonlinear optical materials of the invention.

Polarization $\mu$ which occurs in an organic compound when applied with an electric field is expressed as $\mu = \alpha \cdot E + \beta E \cdot E + \gamma E \cdot E \cdot E + \ldots$ In the equation $\alpha, \beta, \gamma \ldots$ are respectively primary, secondary, tertiary ... molecular susceptibilities. The NLO compound used in the invention is one which has a secondary susceptibility $\beta$ larger than $1 \times 10^{-30}$ esu, preferably larger than $10 \times 10^{-30}$ esu.

As the preferable NLO compounds are mentioned urea derivatives, enone derivatives, nitroaniline derivatives, a variety of heterocyclic compounds, stilben derivatives, etc. As examples of the urea derivative are mentioned and as

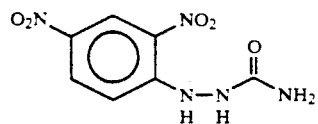

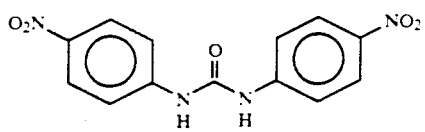

examples of the enone derivative are mentioned

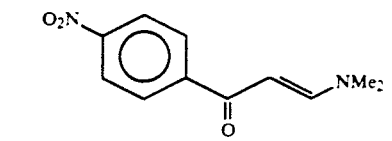

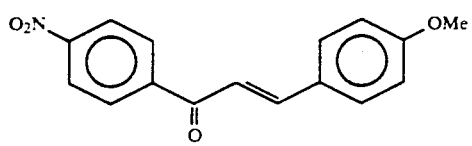

As the nitroaniline derivatives are mentioned

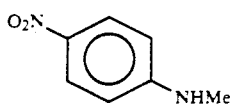

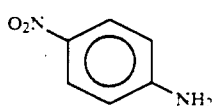

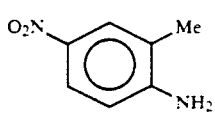

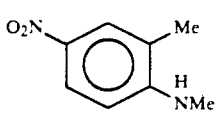

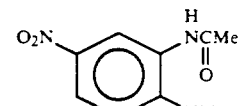

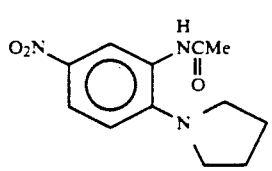

and the like. As examples of the heterocyclic compound are mentioned.

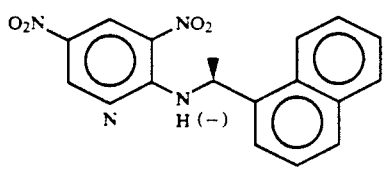

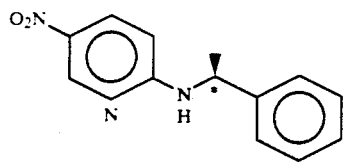

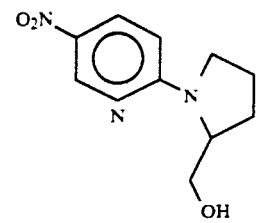

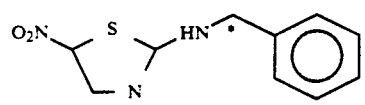

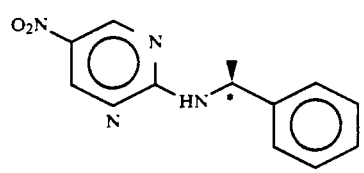

As examples of the stilben derivative are mentioned.

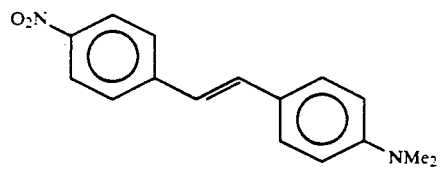

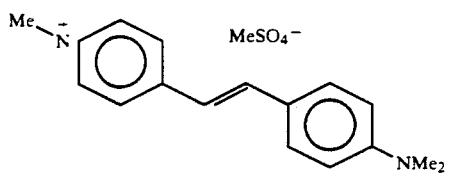

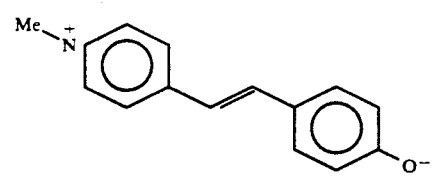

In the above formulae * indicates optically active carbon, and Me represents methyl group.

Whereas these compounds are examples of the compound that can be used in the invention, it is known that compounds with the conjugated $\tau$ electron system and being highly polarized have a large secondary molecular susceptibility, and any compound, even if not illustrated above, may be used in the invention provided that it has a secondary molecular susceptibility larger than $1 \times 10^{-30}$ esu.

It is preferred that the polypeptide used in the non-linear optical materials of the invention is contained in a proportion of 50% by weight or more. For example, there are contained 50-99% by weight of the polypeptide and 1-50% by weight of the NLO compound, preferably being 70-95% by weight and 5-30% by weight respectively.

It content of the NLO compound is less than 1% by weight, conversion efficiency of the incident light to the secondary harmonics will be too small to be practicable, and if it is more than 50% by weight, amount of the guest compound relative to the host polymer will be too large to yield orientation sufficient to give a practicable nonlinear optical response.

In the invention there may be incorporated other compounds provided that they produce no adverse effect upon the optical materials of the invention.

Then methods for preparing the nonlinear optical materials of the invention will be described below. The materials of the invention may be in various forms such as sheet, film and thin film when used as a nonlinear optical component. Although there is no particular limitation to the method for preparing the same, particular methods which may be illustrated include (1) melting and homogeneously blending an NLO compound and a polypeptide at a temperature at which both of the compounds are molten or higher followed by cooling to a temperature within the range that is higher than glass transition temperature of said polymer and is lower than melting point of said blend, (2) Homogeneously dissolving an NLO compound and a polypeptide in a solvent followed by evaporation of the solvent and subsequent cooling of the resulting composition to a temperature lower than melting point of said composition, and (3) Homogeneously dissolving an NLO compound and a polypeptide in a solvent followed by removal of the solvent by evaporation, subsequent application of heat to the composition to melt state and cooling. These particular methods will successively described in details.

It is necessary in the method (1) to melt and blend the two compounds at a temperature sufficiently high to melt the two compounds. The melting and blending are usually carried out at 50°-300° C., the temperature being variable depending upon the compounds used, and are preferably done over a period of from 10 min. to 10 hours, more preferably from 20 min. to 8 hours. Although there is no limitation to the atmosphere in which the melting and blending are conducted, they are usually carried out in air or an inert gas such as nitrogen or helium.

Then, the blend thus produced is cooled at a predetermined rate to a temperature within the range that is lower than melting point of the blend and is higher than glass transition temperature (called Tg hereinbelow for short) of the polypeptide used. The melting point of the blend as used herein is a temperature at which the blend obtained by the melting and blending is solidified, which is different from melting point of the NLO compound alone and that of the polypeptide alone and is generally lower than the two. According to the method of the invention, orientation of the NLO compound without reversal symmetry is produced in the coarse of cooling to the predetermined temperature and subsequent maintenance at the same temperature. Therefore, it is very important to control the temperature attained by cooling from melt state and the temperature at which and the time during which the blend is maintained for a predetermined period of time. It is necessary to allow molecules of the NLO compound to be mobile in the matrix of the polypeptide enough to constitute unsymmetry under regulation of the polypeptide and permit growth of the crystals. In this respect it is most desirable to establish such a state that said blend is in solid but mobility of the polypeptide molecules is maintained. As a matter of fact, it is most adequate that the temperature when cooled is lower than melting point of said blend and is higher than Tg of the polypeptide used. If the temperature when cooled is at or lower than the Tg, unsymmetrical crystals are hardly formed and SHG activity of the nonlinear optical material is undesirably lowered. There is no limitation to the rate at which temperature of the material is lowered from the temperature when molten to the temperature when cooled and cooling rate of 1°-500° C./min. is usually employed. Usually, when content of the NLO compound in the blend is large, for example, 25-50% by weight, rapider cooling at a rate of (00° C./min.-500° C./min. results in larger non-linear optical activity. On the other hand, when content of the NLO compound is as low as 1-10%, spontaneous cooling such as allowing to cool in air or slow cooling at a rate of 1° C./min.-10° C./min. can produce a nonlinear optical material of good activity though rapid cooling is acceptable. After cooled as described above to a predetermined temperature, the nonlinear optical material with a more higher SHG activity can be obtained by maintaining it at a temperature higher than Tg for a predetermined period of time. This operation playing an important role for completing unsymmetrical orientation of the NLO compound. A part of the construction of unsymmetry is accomplished during the cooling as described above, and asymmetrically oriented crystals of the NLO compound grow by maintaining it within said temperature range for a predetermined period of time. It is preferable to maintain for a period of one min. or longer, for example, suitably from 1 min. to 100 hours although the maintaining time is variable depending upon nature and composition of the NLO compound or the polypeptide, the cooling temperature, the maintaining time, etc. Especially it varies with the composition of said blend. When content of the NLO compound is large, for example, 25-50% by weight, a shorter period of about 1 min. to 24 hours may be sufficient, but when content of the NLO compound is smaller, for example, 1-10% by weight, it is generally desirable to maintain for a period of 50 hours or longer.

Next, the preparative method (2) will be described in details.

The solvent used is desirably a solvent in which the two compounds are soluble as readily as possible. It is desirable to use a solvent in which at least 1 g or more, preferably 1.5 g or more of each of the NLO compound and the polypeptide is soluble at 25° C. per 100g of the solvent.

If the solubility is less than 1, a large amount of the solvent must be used with such problems that either of the two compounds alone will be precipitated resulted. For example, if the solubility of the NLO compound is less than 1, the NLO compound alone will be precipitated in the coarse of evaporation of the solvent with a result that ordinary symmetric crystals are formed and there will be produced no material exerting a nonlinear optical response.

On the other hand, if the solubility of the NLO compound is less than 1 g, the polypeptide will be precipitated earlier as the solvent will be evaporated, almost no NLO compound will be contained therein, and therefore no compound exerting an optical response cannot be obtained. Also, if both of the two compounds respectively have a solubility less than 1, solution could be prepared, nevertheless each compound would separately be precipitated during evaporation of the solvent and there would not be produced a solid in homogeneous dispersion of the two. As the solvent, in general, is preferred a polar one as the NLO compound generally has polar groups. However, adequate solvent is variable depending upon nature of the NLO compound, nature of the polypeptide and nature of the combination of the two. Illustrative particular examples include ketones such as acetone, methylethyl ketone, diethylketone and methylisobutylketone, esters such as methyl formate, ethyl formate, methyl acetate, ethyl acetate and butyl acetate, cyclic ethers such as tetrahydrofuran and dioxane, alcohols such as methanol, ethanol, isopropyl alcohol, n-butyl alcohol, isobutyl alcohol, isobutyl alcohol, secbutyl alcohol, t-butyl alcohol and benzyl alcohol, phenols such as phenol, o-cresol, m-cresol and p-cresol, halogenated hydrocarbons such as chloroform, 1,1-dichloromethane, 1,2-dichloroethane, 1,1,1-trichloroethane, 1,1,2,2-tetrachloroethane, trichloroethylene and perchloroethylene, nitro compounds such as nitromethane, nitroethane, nitropropane and nitrobenzene, nitriles such as acetonitrile, propinitrile and butyronitrile, alcohol ethers such as 2-methoxyethanol, 2-ethoxyethanol, methylcellosolve and ethylcellosolve, or N,N-dimethylformamide, dimethylsulfoxide, N-methylpyrrolidone, sulforane and the like. Among them preferred are acetone, methylethylketone, ethyl acetate, tetrahydrofuran, dioxane, methanol, ethanol, chloroform, dichloroethane, 1,1,2,2-tetrachloroethane, perchloroethylene, acetonitrile, methylcellosolve, N,N-dimethylformamide and the like. Total concentration of the NLO compound and the polypeptide to be dissolved in the solvent is 1% by weight—40% by weight, preferably 5% by weight—30% by weight. If the concentration is lower than 1% by weight, the operation will become complicated due to need of evaporating a large amount of the solvent. If it is higher than 40% by weight, viscosity of the solution will be so high that it will be difficult to homogeneously blend the two.

Then, the solvent is removed by evaporation from the solution thus prepared, and the resulting composition is preferably maintained at a temperature lower than its melting point for a predetermined period of time. A high nonlinear optical response is produced especially by carefully controlling the rate at which the solvent is evaporated. Growth of asymmetric crystals is affected by interaction of the polypeptide and the NLO compound during evaporation of the solvent and concentration of the solution. In this respect, the time for which the solvent is removed by evaporation (evaporation time) is critical. The evaporation time as defined herein is the time required for removal by evaporation of 95% or more of the solvent used. The evaporation time in the invention is 5-50 hours, preferably 10 hours-40 hours.

If the evaporation time is shorter than 5 hours, undesirable results will be produced that the rate of evaporation will be so large as to cause movement of the NLO compound thereby growth of asymmetric crystals being inhibited, and moreover, to cause heterogenity of the concentration of the NLO compound. If it is longer than 50 hours, undesirable results will also be produced that asymmetric crystals hardly grow but symmetric crystals are apt to grow. There is no limitation to the temperature to remove the solvent by evaporation, and the removal is made usually at a temperature lower than melting point of the solvent and preferably at a temperature of 100° C. or below. In order to remove the solvent by evaporation within a controlled period of time, it is necessary to select a temperature corresponding to the melting point of the solvent. For example, with a solvent having a boiling point of 150° C. or higher, it is preferable to evaporate the solvent in heating at 50°-100° C. With a solvent having a boiling point lower than 150° C., the object of the invention can be achieved by evaporating the solvent at a temperature in the range between 0° C. and 50° C. In evaporating the solvent it may be either in standing or with stirring. The composition thus obtained by the evaporation of the solvent exerts a non linear optical response and is used as a nonlinear optical material. In addition, it can further be treated by maintaining it at a temperature below melting point of the composition for a predetermined period of time, usually for one min. or longer and preferably for 1 min. to 100 hours to produce a stable nonlinear optical material of superior activity. As described above, the melting point of a composition as herein defined is a temperature at which the composition is entirely molten or solidified. The final process is one necessary for completing construction of the asymmetry. The composition exerts an SHG activity to a considerable extent just after completion of the evaporation of the solvent, but the SHG activity has not reached the maximum in many cases. Therefore, the asymmetric crystals can be subjected to aging by maintaining them at a predetermined temperature for a predetermined period of time thereby achieving the maximum possible activity of the composition. Whereas preferable temperature in this operation is variable depending upon nature of the compound, composition and others, it is necessary for the NLO compound to be allowed for mobility of the molecules sufficient to permit growth of the crystals while constructing asymmetry under regulation by the polypeptide. It is most desirable for the above purpose to be in such state that the entire composition is in solidified state but mobility of the polypeptide molecules is maintained. If the period of time is shorter than one min., the aging affect will not satisfactorily be produced with a result that material exerting a satisfactory nonlinear optical response will not be obtained. If the period of time is longer than 100 hours, the manufacturing time will meaninglessly long because the aging effect has already been produced and further increase in the SHG activity is not expected.

A example of the preparative method (3), specifically used for a cholesteric liquid crystalline polypeptide will be described below. A uniform composition is produced by dissolving and blending a polypeptide and an NLO compound in a solvent common for the two and then evaporating the solvent. Heat is then applied to the composition to maintain molten state. After maintaining a temperature range in which the cholesteric phase appears usually for one min.-20 hours the composition is cooled to fix the cholesteric phase.

Alternatively, when the polypeptide used shows lyotropic cholesteric liquid crystallinity, a solution containing a polypeptide and an NLO compound is well aged over a period of 1 day-10 days. Then, the solvent is slowly evaporated to fix the cholesteric liquid crystalline structure and at the same time to orient the NLO compound. A nonlinear optical material with a high SHG activity can thus be obtained. A nonlinear optical material with a high SHG activity can also be produced by using a polypeptide of thermotropic cholesteric liquid crystallinity, developing more complete asymmetric structure and fixing it. As described above, it is one of the outstanding characteristic features of the invention that asymmetric orientation of an NLO compound can be achieved by the orienting force of a host polypeptide only and a nonlinear optical material with a large nonlinear optical constant can be produced without aid of external force such as an electric field. The satisfactory asymmetrically-oriented structure can also be realized by the use of an electric field. For example, a nonlinear optical material with asymmetrically oriented structure fixed can also be obtained by heating a composition consisting essentially of a polypeptide and an NLO compound inserted between two transparent electrodes and applying an electric field while maintaining the composition at a transition point of the liquid crystals or a higher temperature to produce asymmetric orientation in the polypeptide and the NLO compound followed by cooling from the temperature.

Both of the product without an electric field applied and one with an electric field applied are of a very stable SHG activity which is not deteriorated with time and is also stable under ambient conditions such as temperature change, moisture and oxygen in air. These characteristics are a big advantage in practical use and represent an outstanding characteristic feature of the invention.

Another outstanding characteristic feature of the invention is that a nonlinear optical material which is easily phase-matched is also produced by using a cholesteric liquid crystalline material as polypeptide. Unlike a hematic liquid crystal, the cholesteric liquid crystal is characterized by helical structure. Unique phase matching is feasible by the use of the periodic field of a helical structure and anisotropy to circularly polarized light different from conventional methods using birefringence or optical waveguide.

The nonlinear optical materials according to the invention as described above not only have a large nonlinear optical constant and a high SHG activity but also are very stable without deterioration and are applicable to a variety of opt-electronics such as frequency doubler of laser beam, optical modulation, optical switching and optical computer.

The nonlinear optical materials of the invention will be described below with reference to examples, but it is not intended to limit the invention by these examples.

EXAMPLE 1

In 1,2-dichloroethane were dissolved poly-($\gamma$-methyl-L-glutamate) prepared by the NCA method (degree of polymerization 1,050) and p-nitroaniline respectively in proportions of 90 wt. % and 10 wt. % to a homogeneous solution. The solvent was then slowly evaporated from the solution to prepare a cast film 1 mm in thickness, which was dried at room temperature over one day and used as a sample for SHG measurement. The sample was irradiated with an $Nd^{3+}$/YAG laser beam ($\lambda = 1.06$ $\mu$m). There was observed an SHG with $\lambda = 0.53$ $\mu$m, which was 46 times as high as the SHG intensity of urea used as standard substance.

EXAMPLE 2

In tetrahydrofuran were dissolved poly-($\gamma$-dodecyl L-glutamate) prepared by the NCA method (degree of polymerization 340) and p-nitroaniline respectively in proportions of 95 wt. % and 5 wt. % to a homogeneous solution. The solvent was then evaporated from the solution to prepare a cast film 1 mm in thickness. The film was dried at room temperature over one day and was used as a sample for SHG measurement. The sample was irradiated with an $Nd^{3+}$/YAG laser beam ($\lambda = 1.06$ $\mu$m). There was observed an SHG with $\lambda = 0.53$ $\mu$m, which was 39 times as high as that of urea used as a standard substance.

EXAMPLE 3-6

Compositions were prepared in the same way as in Example 1 using various glutamate ester polypeptides. Intensity of the SHG when irradiated with an $Nd^{3+}$/YAG laser beam ($\lambda = 1.06$ $\mu$m) was measured. Results are shown in Table 1.

TABLE 1

| Example | Polypeptide | NLO compound | Relative intensity of SHG with 1 for urea |
|---|---|---|---|
| 3 | Poly ($\gamma$-benzyl L-glutamate) DP = 150, 80 wt. % | p-NA 20 wt. % | 126 |
| 4 | Poly ($\gamma$-cyanobenzyl L-glutamate) DP = 270, 70 wt. % | p-NA 30 wt. % | 134 |
| 5 | Poly ($\gamma$-benzyl L-glutamate-CO-$\gamma$-dedecyl L-glutamate) Composition ratio 60/40, DP-230 90 wt. % | p-NA 10 wt. % | 107 |
| 6 | Poly ($\gamma$-butyl D-glutamate-CO-$\gamma$-octadecyl D-glutamate) Composition ratio 32/68, DP-320, 70 wt. % | MNA 30 wt. % | 53 |

DP: Degree of polymerization for the polymer
p-NA: p-Nitroaniline
MNA: 2-Methyl-4-nitroaniline

COMPARATIVE EXAMPLE 1

From a benzene solution containing 80 wt. % of poly (methyl methacrylate) and 20 wt. % of p-nitroaniline was slowly evaporated the solvent to prepare a cast film 1 mm in thickness. The film was dried overnight under vacuum at room temperature and was used as a sample for SHG measurement. The sample was irradiated with an $Nd^{++}$/YAG laser beam, but there was no SHG generated at all.

COMPARATIVE EXAMPLE 2

From a benzene solution containing 80 wt. % of poly (ehtylene oxide) (molecular weight 20,000) and 20 wt. % of p-nitroaniline was prepared a sample for SHG measurement in the same way as in comparative Example 1. The sample was irradiated with an $Nd^{3+}$/YAG laser beam. There was observed a weak SHG only 2.1 times as high as that of urea used as a standard substance.

EXAMPLE 7-11

Samples were prepared in the same way as in Example 1 using various polyaspartate prepared by the NCA method and were irradiated with an $Nd^{3+}$/YAG laser beam to examine the SHG intensity. Results are shown in Table 2.

TABLE 2

| Example | Polypeptide | NLO compound | Relative intensity of SHG with 1 for urea |
|---|---|---|---|
| 7 | Poly (β-benzyl L-aspartate) DP = 120, 90 wt. % | p-NA 10 wt. % | 74 |
| 8 | Poly [β- (4-nitrobenzyl) L-aspartate] DP = 420, 95 wt. % | p-NA 5 wt. % | 79 |
| 9 | Poly (β-butyl D-aspartate) DP = 350, 90 wt. % | MNA 10 wt. % | 47 |
| 10 | Poly (β-ethyl L-aspartate-CO-β-dodecyl L-aspartate) DP - 220, 90 wt. % | MNA 10 wt. % | 52 |
| 11 | Poly (β-biphenylmethyl L-aspartate) DP = 87, 80 wt. % | DANS 20 wt. % | 76 |

DANS Dimethylaminonitrostilbene

EXAMPLE 12

A sample for SHG measurement was prepared in the same way as in Example 1 from a cost film prepared from a solution containing 90 wt. % of poly (L-phenylalanine)(DP =110) prepared by the NCA method and 10 wt. % of N-methyl-2-methyl-4-nitroaniline. The sample was irradiated with an $Nd^{3+}$/YAG laser beam ($\lambda = 1.06$ μm). There was developed an SHG with $\lambda = 0.53$ μm, intensity of which was 32 times as high as that of urea.

EXAMPLE 13

A sample for SHG measurement was prepared in the same way as in Example 1 using a cast film prepared from a solution containing 60 wt. % of Poly (O-benzyl L-serine) (DP=280) prepared by the NCA method and 40 wt. % of N,N-dimethylaminonitrostilben. The sample was irradiated with an $Nd^{3+}$/YAG laser beam ($\lambda = 1.06$ μm). There was developed an SHG with $\lambda = 0.53$ μm.

EXAMPLE 14

A sample for SHG measurement was prepared in the same way as in Example 1 using a cast film prepared from a solution containing 90 wt. % of poly (L-proline)(DP=350) prepared by the NCA method and 10 wt. % of N,N-dimethylaminonitrostilben. The sample was irradiated with an $Nd^{3+}$/YAG laser beam to examine development of the SHG. There was observed an SHG 150 times as high as that of urea.

EXAMPLE 15

Poly (γ-benzyl L-glutamate)(DP=180) prepared by the NCA method was subjected to an ester exchange using tetradecyl alcohol in 1,2-dichloroethane to produce a copolymer with a composition ratio of the benzyl ester to the tetradecyl ester of 50:50. From a tetrahydrofuran solution containing 80 wt. % of the polymer and 20 wt. % of p-nitroaniline was prepared a cast film 1 mm in thickness. The film was inserted between two glass plates through a spacer 100 μm in thickness, subjected to heat treatment at 130° C. for 3 hours and rapidly cooled to prepare a sample for SHG measurement. The sample was irradiated with an $Nd^{3+}$/YAG laser beam. There was observed development of an SHG intensity of which was (137 times as high as that of urea.

EXAMPLE 16

The cast film prepared in Example 15 was inserted between two transparent, electrically conductive glass plates and heated at 130° C. for one hour. Then, DC voltage of 200V was applied between the two glass plates for 5 min. while maintaining the same temperature. Then, the film was cooled to prepare a sample for SHG measurement. The sheet was measured for the intensity of SHG in the same way as in Example 15, which was 163 times as high relative to urea.

EXAMPLE 17

Four samples each inserted between two glass plates through a spacer were prepared using the cast film prepared in Example 15. The samples were heated at 130° C., 135° C., 140° C. and 145° C., respectively, for 3 hours and then cooled. When the four samples were measured for SHG, there was observed development of an SHG in every sample, intensity of which, however, was clearly different one another with difference in treatment temperature. The difference indicates that phase matching took place, which difference is attributed to change of the helical pitch of the cholesteric liquid crystals with temperature.

REFERENCE EXAMPLE 1

To a solution of 20 g of poly (γ-benzyl L-glutamate prepared by the NCA method in 300 ml of 1,2-dichloroethane were added 150 ml of n-dodecyl alcohol and 5 g of p-toluenesulfonic acid. The mixture was allowed to react at 60° C. for 15 hours. The reaction mixture was to precipitate a polymer, which was then filtered and dried. The polymer was redissolved in 1,2-dichloroethane and reprecipitated with methanol. Separation by filtration and drying of the precipitates yielded purified γ-benzyl L-glutamate-γ-dodecyl L-glutamate copolymer. Ratio of the benzyl ester to the dodecyl ester was 60:40 by NMR measurement.

EXAMPLE 18

A homogeneous solution was prepared by dissolving in tetrahydrofuran the γ-benzyl L-glutamate-γ-dodecyl L-glutamate copolymer and p-nitroaniline respectively in proportions of 80% and 20%. From the solution was evaporated the solvent to form a cast film, which was inserted between slide glass and cover glass heated at 130° C. to extend it. The film was heated at 130° C. for 4 hours and then rapidly cooled to prepare a sample for measurement of secondary harmonics (called SHG hereinbelow for short). When the sample was irradiated with an $Nd^{3+}$/YAG laser beam ($\lambda = 1.06$ μm), an SHG with $\lambda = 0.53$ μm was observed, intensity of which was 18 times as high as that of urea used as standard substance.

EXAMPLE 19

A cast film was prepared in the same way as in Example 18 using the polymer prepared in Reference Example 1. The film was then inserted between two transparent, electrically conductive glass plates through a spacer 100 μm in thickness and heated at 130° C. to extend it. Then, DC voltage of 200V was applied between the two glass plates for 5 min. while maintaining the temperature a 130° C., and the film was then rapidly cooled to prepare a sample for SHG measurement. When the sample was irradiated with an $Nd^{3+}$/YAG laser beam, there was observed an SHG with $\lambda = 0.53$ μm, intensity of which was 30 times as high as that of urea used as a standard substance.

REFERENCE EXAMPLE 2

To a solution of 20 g of poly (γ-methyl L-glutamate)-(molecular weight 150,000, average degree of polymerization 1050) in 300 ml of 1,2-dichloroethane were added 100 ml of n-hexanol and 5 g of p-toluenesulfonic acid. The mixture allowed to react at 60° C. for 20 hours. The reaction mixture was poured into a large amount of methanol to precipitate a polymer, which was collected and dried. The polymer was then redissolved in 1,2-dichloroethane and reprecipitated with methanol followed by drying to obtain purified γ-methyl L-glutamate-γ-hexyl L-glutamate copolymer. Ratio of the methyl ester to the hexyl ester was 51:49 by NMR measurement.

EXAMPLE 20

A homogeneous solution was prepared by dissolving in tetrahydrofuran the polymer prepared in Reference Example 2 and m-nitroaniline respectively in proportions of 70% and 30%. From the solution was then evaporated the solvent to prepare a cast film, which was inserted between slide glass and cover glass through a spacer 1 mm in thickness and heated at 170° C. to extend it. The film was then subjected to heat treatment at 170° C. for 2 hours followed by rapid cooling to prepare a sample for SHG measurement. When the sample was irradiated with an $Nd^{3+}$/YAG laser beam ($\lambda = 1.06$ μm), there was observed development of an SHG with $\lambda = 0.53$ μm, intensity of which was 29 times as high as that of urea.

REFERENCE EXAMPLE 3

To a solution of 20 g of poly (γ-butyl D-glutamate) (molecular weight 42,000, average degree of polymerization 230) prepared by the NCA method were added 150 ml of n-dodecyl alcohol and 5 g of p-toluenesulfonic acid. The mixture was allowed to react at 60° C. for 20 hours. The reaction mixture was treated in the same way as in Reference Example 1 to obtain a γ-butyl L-glutamate-γ-dodecyl L-glutamate copolymer. Ratio of the butyl ester to the dodecyl ester in the copolymer was 40:60 by NMR measurement.

EXAMPLE 21

A homogeneous solution was prepared by dissolving in tetrahydrofuran the polymer prepared in Reference Example 3 and p-nitroaniline respectively in proportions of 90% and 10%. Then, a cast film prepared using the solution was inserted between slide glass and cover glass through a spacer 1 mm in thickness and heated at 120° C. to extend it. Heating was continued at the same temperature for 2 hours followed by rapid cooling to prepare a sample for SHG measurement. When the sample was irradiated with an $Nd^{3+}$/YAG laser beam ($\lambda = 1.06$ μm), there was observed development of an SHG with $\lambda = 0.53$ μm, intensity of which was 16 times as high as that of urea.

EXAMPLE 22

A cast film was prepared in the same way as in Example 18 using a γ-cyanobenzyl L-glutamate-γ-hexadecyl L-glutamate copolymer (average degree of polymerization 143, ratio of the cyanobenzyl ester to the hexadecyl ester 69:31) prepared in the same way as in Reference Example 1 and 4-dimethyl-amino-4'-nitrostilben respectively in proportions of 80% and 20%. The film was inserted between slide glass and cover glass through a spacer 1 mm in thickness and heated at 100° C. for 2 hours followed by rapid cooling to prepare a sample for SHG measurement. When the sample was irradiated with an $Nd^{3+}$/YAG laser beam ($\lambda = 1.06$ μm), there was observed an SHG with $\lambda = 0.53$ μm intensity of which was 27 times as high as that of urea.

EXAMPLE 23

The cast film prepared in Example 22 was inserted between two transparent, electrically conductive glass plates through a spacer 100 μm in thickness and heated at 100° C. to extend it. Then, DC voltage of 200V was applied to the sample for 5 min. while maintaining it at 100° C. followed by rapid cooling to prepare a sample for SHG measurement. Intensity of the SHG of the sample was 43 times as high as that of urea, which corresponded to a 1,6-fold increase as compared with Example 22.

EXAMPLE 24

A cast film was prepared in the same way as in Example 18 using a 4-methylbenzyl L-glutamate-γ-octadecyl L-glutamate copolymer (average degree of polymerization 340, ratio of the 4-methylbenzyl ester to the octadecyl ester 29:71) prepared in the same way as in Reference Example 1 and N,N-dimethyl-p-nitroaniline) respectively in proportions of 95% and 5%. Then, the film was inserted between slide glass and cover glass through a spacer 100 μm in thickness and heated at 80° C. for 3 hours followed by rapid cooling to prepare a sample for SHG measurement. When the sample was irradiated with an $Nd^{3+}$/YAG laser ($\lambda = 1.06$ μm), there was observed an SHG with $\lambda = 0.53$ μm intensity of which was 12 times as high as that of urea.

EXAMPLE 25

Four samples each inserted between two glass plates through a spacer were prepared using the cast film prepared in Example 18. The samples were heated at 125° C., 130° C., 135° C. and 140° C., respectively, for 4 hours and then rapidly cooled. When the four samples were measured for SHG, there was observed development of an SHG in every sample, intensity of which, however, was clearly different one another with difference in treatment temperature. The difference is attributed to change of the helical pitch of the cholesteric liquid crystals with temperature and indicates that phase matching took place.

EXAMPLE 26

A sheet 1 mm in thickness was prepared in the same way as in Example 1 using a mixture of poly (γ-benzyl L-glutamate-CO-γ-dedecyl L-glutamate) (molar ratio of the benzyl ester to the dodecyl ester 60/40; [7] 0.51; the polymer has no Tg but a transition point exists at −45° C. based upon the side-chain relaxation) and p-nitroaniline respectively in proportions of 70% by weight and 30% by weight except that, the melt blending conditions were at 135° C. for 30 min. Then the sheet was placed on a plate for allowing to cool to rapidly cool to room temperature and maintained at room temperature for 10 min. to prepare a sample for SHG measurement. When intensity of the SHG was measured in the same way as in Example 1, there was observed an SHG 87 times as strong as that of urea. The SHG intensity of the sample remained fully unchanged when measured after 6 months thereby indicating that it was very stable.

EXAMPLE 27

A homogeneous solution was prepared by dissolving in 7 g of tetrahydrofuran 0.9 g of poly (γ-benzyl L-glutamate) ([7]=0.51 in trichloroacetic acid at 30° C.) and 0.1 g of p-nitroaniline. From the solution was evaporated the solvent at 25° C. over a period of 20 hours to produce a cast film 200 μm in thickness. The film was maintained at 50° C. for additional 72 hours. The sample thus obtained was measured for intensity of SHG in the same way as in Example 1. There was observed an SHG 48 times as strong as that of urea.

EXAMPLE 28

A homogeneous solution was prepared by dissolving in 9 g of tetrahydrofuran 0.8 g of poly-(γ-benzyl L-glutamate-CO-γ-dodecyl L-glutamate) (molar ratio of the benzyl ester to the dedecyl ester 60/40, [7]=0.40 in trichloroacetic acid at 30° C.) and 0.2 g of p-nitroaniline. The solution was placed in a teflon dish, from which the solvent was evaporated at 25° C. over a period of 15 hours to prepare a cast film 200 μm in thickness. The film was maintained in a thermostatic chamber at 40° C. for additional 30 min. The sample thus obtained was measured for intensity of SHG in the same way as in Example 1. There was observed an SHG 122 times as strong as that of urea. The intensity of SHG was not lowered at all after 60 days thereby indicating that it was very stable.

EXAMPLE 29

A homogeneous solution was prepared by dissolving in 7 g of dimethylformamide 0.92 g of poly (γ-biphenyl-methyl glutamate) ([7]=0.38 in trichloroacetic acid at 30° C.) and 0.08 g of 4-dimethylamino-4-nitrostilben. From the solution was evaporated the solvent at 40° C. over a period of 48 hours to prepare a cast film. The film was maintained in an air thermostatic chamber at 50° C. for additional 24 hours. The sample thus obtained was measured for intensity of SHG in the same way as in Example 1. There was observed an SHG 31 times as strong as that of urea.

EXAMPLE 30

A homogeneous solution was prepared by dissolving in 9 g of 1,1,2,2-tetrachloroethane 0.85 g of poly (n-butyl methacrylate) ([7]=0.57 in benzene at 30° C.) and 0.15 g of N-methyl-2-methyl-4-nitroaniline. From the solution was evaporated the solvent at 25° C. over a period of 48 hours to prepare a film 200 μm in thickness. The film was maintained at 40° C. for additional 24 hours. The sample thus obtained was measured for intensity of SHG in the same way as in Example 1. There was observed an SHG 41 times as strong as that of urea.

EXAMPLE 31

A homogeneous solution was prepared by dissolving in 19 g of a mixed solvent of tetrahydrofuran/1,2-dichloroethane (½ in volume ratio) 0.7 g of poly (γ-methyl D-glutamate) ([7]=0.32 in trichloroacetic acid at 30° C.) and 0.3 g of p-nitroaniline. A cast film 200 μm in thickness was prepared from the solution at 25° C. over a period of 10 hours.

The cast film was maintained in an air thermostatic chamber at 40° C. for additional 72 hours. When the sample thus obtained was again measured for SHG, there was observed an SHG 21 times as strong as that of urea thus indicating a remarkable increase in SHG activity.

EFFECT OF THE INVENTION

In the nonlinear optical materials of the invention asymmetric orientation can be brought about to a high degree by the use of orientating force of a peptide with a result that a large nonlinear optical constant can be produced. These excellent properties, moreover, can easily be fixed by the use of easiness in fixing properties of the polypeptide. In addition, the materials are characterized in that phase matching can be effected using periodicity of the helix structure possessed by cholesteric liquid crystals. They are suitable for use in a variety of devices in optoelectrics such as frequency doubler of the laser beam, optical modulation, optical switching and optical computer.

What is claimed is:

1. A nonlinear optical material comprising a composition consisting essentially of (a) 50–91% weight of a polypeptide, said polypeptide being a homopolymer of an amino acid or a copolymer of two or more amino acids, said amino acid or acids selected from alanine, aminoadipic acid, aminobutyric acid, aminocaproic acid, aminocyclohexanoic acid, aminovaleric acid, aminomalonic acid, arginine, asparagine, aspartic acid, cysteine, glutamic acid, glycine, histidine, homocysteine, isoleucine, leucine, lysine, methionine, norvaline, ornithine, phenylalanine, serine, threonine, tyrosine, valine, and proline; and (b) 1–50% by weight of a compound exerting a non-linear optical response, said compound having a secondary molecular susceptibility larger than $1 \times 10^{-30}$ esu and being selected from the group consisting of urea derivatives, enone derivatives, nitroaniline derivatives, heterocyclic compounds, stilben derivatives and merocyanines, wherein said urea derivative is

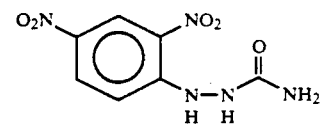

or

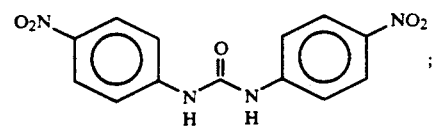

said enone derivative is

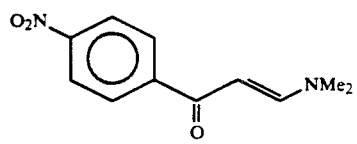

or

-continued

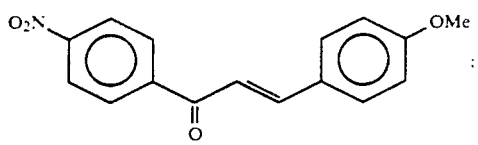

said nitroaniline derivative is

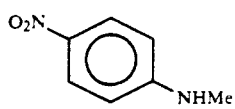

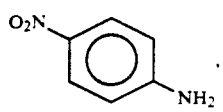

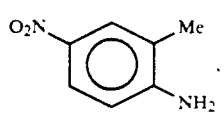

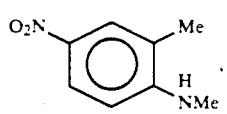

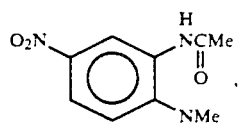

or

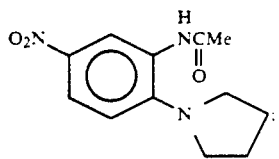

said heterocyclic compound is

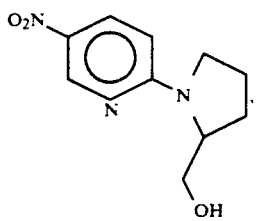

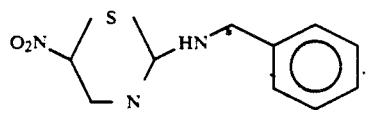

or

-continued

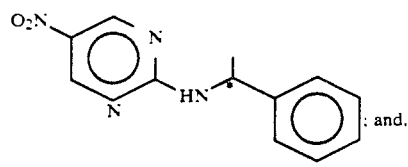; and, said stilben derivative is

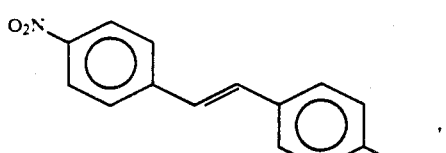,

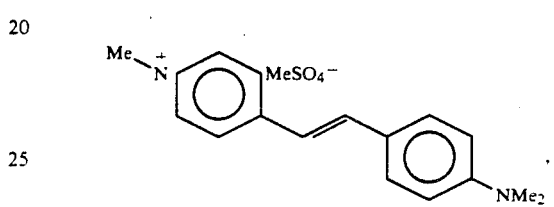, or

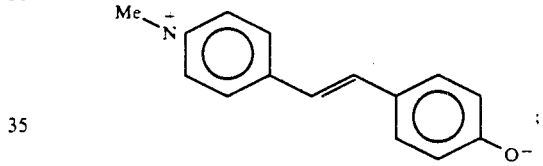;

wherein
Me = a methyl group and
\* = an optically active carbon.

2. A nonlinear optical material according to claim 1 wherein the polypeptide is a cholesteric liquid crystalline polypeptide.

3. A nonlinear optical material according to claim 2 wherein the cholesteric liquid crystalline polypeptide is a polyglutamate or a polyaspartate polymer.

4. A nonlinear optical material according to claim 2 or 3 wherein the cholesteric liquid crystalline polypeptide is a compound represented by the general formula [I]

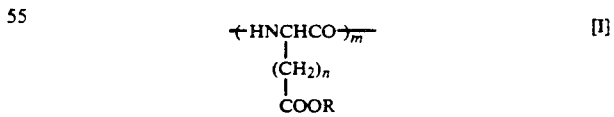 [I]

wherein R represents a group selected from the group consisting of alkyl groups, cycloalkyl groups, aryl groups and arylalkyl groups containing 1–30 carbon atoms, $10 \leq m\ 2000$ for m and n is 1 or 2.

5. A nonlinear optical material according to claim 2, 3 or 4 wherein the cholesteric liquid crystalline polypeptide is a polymer represented by the general formula [II]

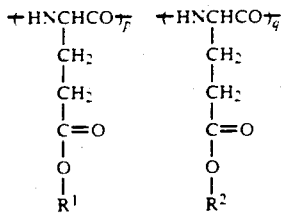

wherein $R_1$ and $R_2$ respectively represent a group selected from the group consisting of alkyl groups, cycloalkyl groups, aryl groups and arylalkyl groups containing 1-10 carbon atoms for $R_1$ or 6-30 carbon atoms for $R_2$ provided that $R_1$ and $R_2$ are not the same, $50 \leq p+q \leq 200$ and $p/q = 80-10/20-90$ for p and q.

6. A process for preparing a nonlinear optical material which comprises uniformly melt blending effective amounts to provide a nonlinear optical material of a polypeptide and a compound exerting a nonlinear optical response at a temperature at which both of the two are molten and subsequently cooling the blend within a temperature range between one higher than glass transition temperature of said polypeptide and one lower than melting point of said blend.

7. A process for preparing nonlinear optical material which comprises uniformly dissolving effective amounts to provide a nonlinear optical material of a polypeptide and a compound exerting a nonlinear optical response in a solvent, subsequently removing said solvent by evaporation and cooling the composition thus obtained to a temperature below melting point of said composition.

* * * * *

UNITED STATES PATENT AND TRADEMARK OFFICE
CERTIFICATE OF CORRECTION

PATENT NO. : 5,097,016

DATED : March 17, 1992

INVENTOR(S) : Takafumi Ishii, et al.

It is certified that error appears in the above-identified patent and that said Letters Patent is hereby corrected as shown below:

Title page, No. [75], Lines 2 and 3, "Itoh Hiroyuki" should read as --Hiroyuki Itoh--.

Column 3, Line 43, "$R_2$" should read as --$R_s$--.

Column 3, Line 56, "$R^1$" and "$R^2$" should read as --$R_1$-- and --$R_2$--.

Column 3, Line 60, "ary" should read as --aryl--.

Column 5, Line 61 through Column 6, Line 29,

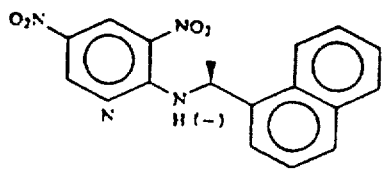

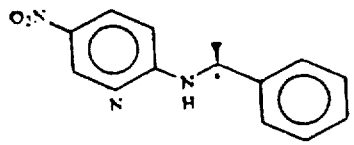

UNITED STATES PATENT AND TRADEMARK OFFICE
CERTIFICATE OF CORRECTION

PATENT NO. : 5,097,016
DATED : March 17, 1992
INVENTOR(S) : Takafumi Ishii, et al.

It is certified that error appears in the above-identified patent and that said Letters Patent is hereby corrected as shown below:

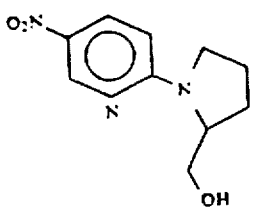

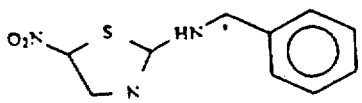

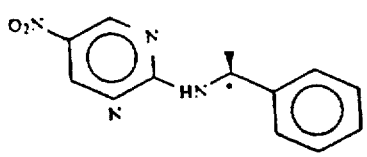

should read as

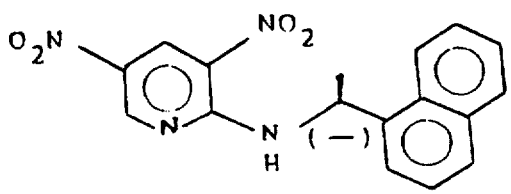

UNITED STATES PATENT AND TRADEMARK OFFICE
CERTIFICATE OF CORRECTION

PATENT NO. : 5,097,016

DATED : March 17, 1992

INVENTOR(S) : Takafumi Ishii, et al.

It is certified that error appears in the above-identified patent and that said Letters Patent is hereby corrected as shown below:

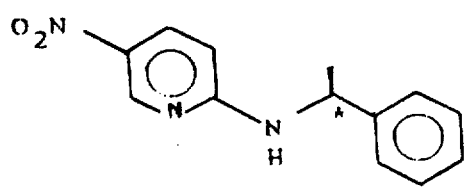

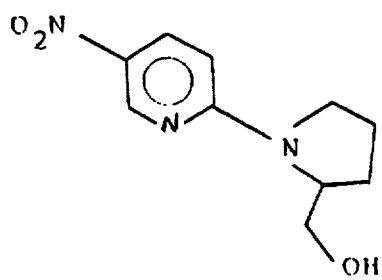

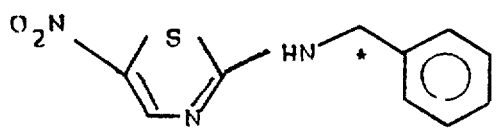

UNITED STATES PATENT AND TRADEMARK OFFICE
CERTIFICATE OF CORRECTION

PATENT NO. : 5,097,016
DATED     : March 17, 1992
INVENTOR(S): Takafumi Ishii, et al.

It is certified that error appears in the above-identified patent and that said Letters Patent is hereby corrected as shown below:

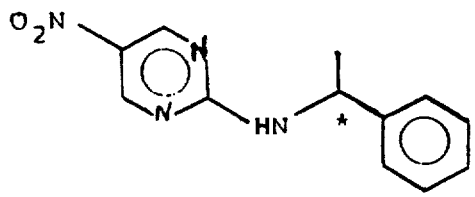

Column 6, Line 60, "τ" should read as --π--.

Column 8, Line 56, "1 ," should read as --1g,--.

Column 8, Line 60, "1 ," should read as --1g,--.

Column 9, Line 3, "1 ," should read as --1g,--.

Column 9, Line 18, delete "isobutyl alcohol", second instance.

Column 10, Line 16, "non linear" should read as --nonlinear--.

UNITED STATES PATENT AND TRADEMARK OFFICE
CERTIFICATE OF CORRECTION

PATENT NO. : 5,097,016
DATED : March 17, 1992
INVENTOR(S) : Takafumi Ishii, et al.

It is certified that error appears in the above-identified patent and that said Letters Patent is hereby corrected as shown below:

Column 12, Line 49, "$Nd^{++}$" should read as --$Nd^{3+}$--.

Column 17, Line 37, "4-nitrostilben" should read as --4'-nitrostilben--.

Column 18, Line 23, Claim 1, "91%" should read as --99%--.

Column 18, Line 30, Claim 1, "aminomalonic" should read as --aminomalinic--.

Column 19, Line 38, Claim 1, "NMe" should read as --$NMe_2$--.

Column 19, Line 51, through Column 20, Line 8, Claim 1,

UNITED STATES PATENT AND TRADEMARK OFFICE
CERTIFICATE OF CORRECTION

PATENT NO. : 5,097,016

DATED : March 17, 1992

INVENTOR(S) : Takafumi Ishii, et al.

It is certified that error appears in the above-identified patent and that said Letters Patent is hereby corrected as shown below:

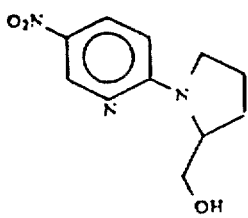

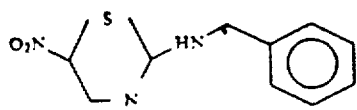

or

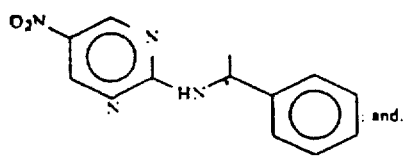

and.

should read as

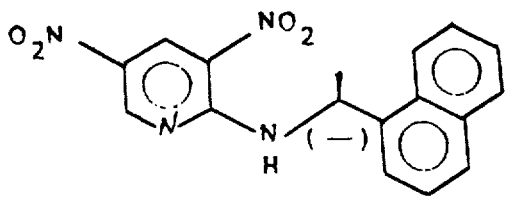

UNITED STATES PATENT AND TRADEMARK OFFICE
CERTIFICATE OF CORRECTION

PATENT NO. : 5,097,016

DATED : March 17, 1992

INVENTOR(S) : Takafumi Ishii, et al.

It is certified that error appears in the above-identified patent and that said Letters Patent is hereby corrected as shown below:

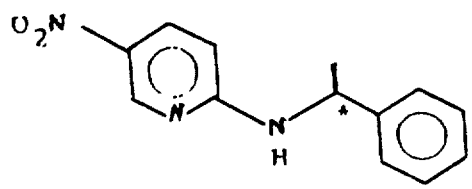

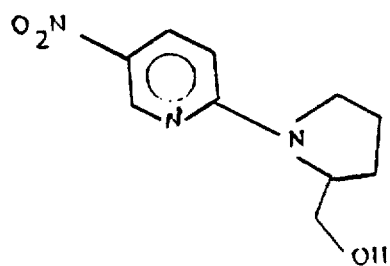

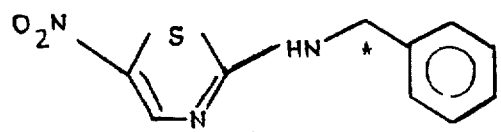

UNITED STATES PATENT AND TRADEMARK OFFICE
CERTIFICATE OF CORRECTION

PATENT NO. : 5,097,016
DATED : March 17, 1992
INVENTOR(S) : Takafumi Ishii, et al.

It is certified that error appears in the above-identified patent and that said Letters Patent is hereby corrected as shown below:

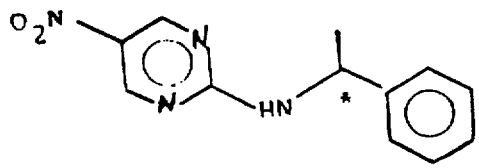

Column 21, Line 10, Claim 5, "$R^1$" and "$R^2$" should read as --$R_1$-- and --$R_2$--.

Signed and Sealed this

Fourteenth Day of December, 1993

Attest:

BRUCE LEHMAN

Attesting Officer     Commissioner of Patents and Trademarks